US009039571B2

(12) United States Patent
Doering et al.

(10) Patent No.: US 9,039,571 B2
(45) Date of Patent: May 26, 2015

(54) METHOD AND SYSTEM FOR ENGINE CONTROL

(75) Inventors: Jeffrey Allen Doering, Canton, MI (US); Joseph Norman Ulrey, Dearborn, MI (US); Alex O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 13/025,922

(22) Filed: Feb. 11, 2011

(65) Prior Publication Data

US 2012/0208674 A1 Aug. 16, 2012

(51) Int. Cl.
| B60W 10/04 | (2006.01) |
| B60W 30/18 | (2012.01) |
| F02D 41/00 | (2006.01) |
| F02D 41/02 | (2006.01) |
| F02D 41/04 | (2006.01) |
| F02D 41/06 | (2006.01) |
| F02N 11/00 | (2006.01) |
| F02N 11/08 | (2006.01) |
| F02N 15/00 | (2006.01) |

(52) U.S. Cl.
CPC ......... F02D 41/0002 (2013.01); *Y10T 477/675* (2015.01); *B60W 10/04* (2013.01); *B60W 30/18* (2013.01); F02D 41/0215 (2013.01); *F02D 41/022* (2013.01); F02D 41/042 (2013.01); F02D 41/064 (2013.01); F02D 41/065 (2013.01); F02D 41/0025 (2013.01); *F01L 2800/03* (2013.01); *F02D 2041/001* (2013.01); *F02D 2200/0414* (2013.01); *F02D 2200/703* (2013.01); *Y02T 10/42* (2013.01); *F02N 11/00* (2013.01); *F02N 11/0814* (2013.01); *F02N 11/0822* (2013.01); *F02N 11/0844* (2013.01); *F02N 15/006* (2013.01)

(58) Field of Classification Search
CPC ............ F02N 11/0803; F02N 11/0814; F02N 11/0818; F02N 11/0822; F02N 11/0829; F02N 11/0823; F02N 11/0844; B60W 10/06; B60K 13/00; B60K 13/02; F16H 63/502; F16H 61/05
USPC .................................. 477/101, 102; 701/112
See application file for complete search history.

(56) References Cited

U.S. PATENT DOCUMENTS

| 7,527,028 | B2 * | 5/2009 | Leone | 123/90.15 |
| 2003/0106515 | A1 * | 6/2003 | Kondo | 123/179.4 |
| 2005/0229880 | A1 * | 10/2005 | Hashizume | 123/90.15 |
| 2009/0205889 | A1 * | 8/2009 | Leone | 180/65.265 |

FOREIGN PATENT DOCUMENTS

EP    WO2007142322    * 12/2007

* cited by examiner

*Primary Examiner* — Edwin A Young
*Assistant Examiner* — Colby M Hansen
(74) *Attorney, Agent, or Firm* — Julia Voutyras; Alleman Hall McCoy Russell & Tuttle LLP

(57) ABSTRACT

Methods and systems are provided for controlling an engine system with a variable cam timing device. In one example, the variable cam timing device is operated to adjust engine valve timing differently at engine stop based on whether the engine stop is in response to an operator request or in response to an automatic controller initiated engine stop without an operator request.

17 Claims, 5 Drawing Sheets

METHOD AND SYSTEM FOR ENGINE CONTROL

FIELD

The present application relates to methods and systems for controlling an engine shut-down and/or a subsequent engine restart.

BACKGROUND AND SUMMARY

Vehicles have been developed to perform an engine stop when idle-stop conditions are met and then to automatically restart the engine when restart conditions are met. Such idle-stop systems enable fuel savings, reduced exhaust emissions, reduced vehicle noise, and the like.

Other engines may be configured with variable cam timing mechanisms wherein cam timing can be adjusted at engine shut-down to reduce engine emissions and the potential for engine misfire. By repositioning the cam in response to a request to stop the engine, pumping of air to the exhaust system can be reduced so that engine emissions can be improved. Cam timing may also be adjusted during engine restarting to reduce engine speed flare.

However, the inventors herein have recognized that there may be conflicting requirements when the engine is automatically shut-down by an engine controller of the idle-stop system (e.g., in response to selected idle-stop conditions being met and without an operator request to stop the engine) versus when the engine is shutdown by the operator. For example, if an engine is stopped via a controller to save fuel during an engine idle period, it may be reasonably expected that the engine will be restarted within a short time period to provide torque to propel the vehicle since the driver has not requested that the engine be stopped. Restarting the engine when the engine is warm and has relatively low friction as compared to when the engine is cold may require less engine torque. As such, a reduced cylinder air charge may be necessary to restart the engine. Further, by reducing the amount of air supplied to engine cylinders during a warm engine restart, it may be possible to reduce engine emission and engine speed overshoot to improve engine starting. In addition, a short engine start time driven by an operator torque request and facilitated by determining engine position at stop may be expected by the operator. Thus, it may be desirable to position the intake valve cam in a retarded position during engine shutdown (e.g., the time between an engine stop request and zero engine rotation) so that the engine may be restarted during warm conditions with a reduced air charge.

On the other hand, if an operator requests to stop the engine (e.g., via a key-off or push-button depression), it may be reasonably expected that the operator intends to not operate the engine for a period of time. If the engine remains in an off state for an extended period of time, the engine may cool down such that engine friction is higher during an engine restart as compared to when the engine is restarted during warm conditions. Further, since the engine may be cold the operator may expect a longer starting time. Consequently, engine intake valve timing and engine air charge requirements may be different between controller and operator initiated engine stops.

Thus, in one example, some of the above issues may be addressed by a method of controlling an engine that is automatically deactivated in response to selected idle-stop conditions. In one example, the method comprises, adjusting an intake valve closing timing to a first timing in response to an operator requested engine stop, and adjusting the intake valve closing timing to a second timing in response to an automatic controller requested engine stop.

By adjusting intake valve closing timing to timings that depend on whether the engine stop request was generated via an engine controller or an operator, it may be possible to pre-position intake valve closing timing such that the engine is better prepared for a subsequent engine restart. For example, if the engine is stopped automatically via a controller during warm ambient conditions, cam timing can be retarded in anticipation that a smaller cylinder air charge may be used to restart the engine and limit engine speed overshoot. Further, retarded valve timing may reduce engine shake during engine stopping. Conversely, if the engine is stopped via an operator request, cam timing can be set to a more advanced position so that the engine cylinders receive additional air during a subsequent engine restart. In this way, the engine may be restarted with increased torque during cold conditions to positively accelerate the engine.

In some examples, while the engine is spinning to rest following a controller engine stop request, the vehicle operator may have a change of mind (COM) and may wish to restart the engine. Thus, in one example, while the engine is spinning to rest, the valve timing may be further adjusted based on the engine speed. Thus, when the engine speed is above a threshold speed that can support the driver COM restart request, the valve timing may be adjusted to increase cylinder air charge. In contrast, when the engine speed is lower than the threshold, the valve timing may be adjusted to a different timing that supports pumping less air through the engine and restarting the engine during warm conditions.

In some examples, the transmission may be tied-up during the engine idle-stop shutdown to reduce engine restart times when restart conditions are met. Thus, during the controller initiated engine stop, the valve timing may also be adjusted based on transmission speed and transmission tie-up torque to compensate for air charge adjustments in view of the idle-stop transmission tie-up.

In this way, by adjusting the valve timing differently based on the differences between an engine idle-stop and an engine operator shutdown request, as well as the various engine adjustments performed during an engine idle-stop, the engine may be kept engine restart ready.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
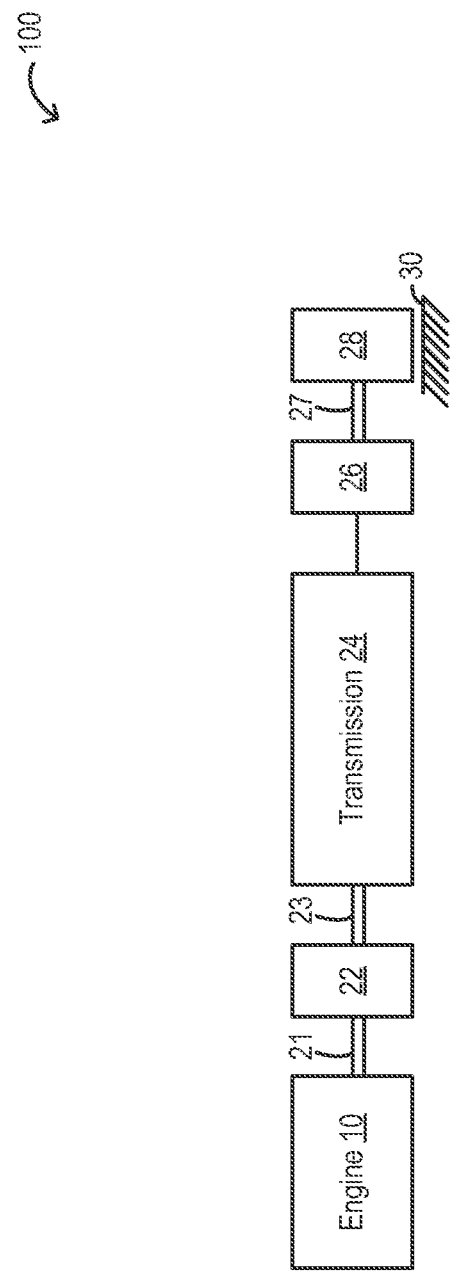
FIG. 1 shows an example vehicle system layout, including a vehicle powertrain.
Figure 2:
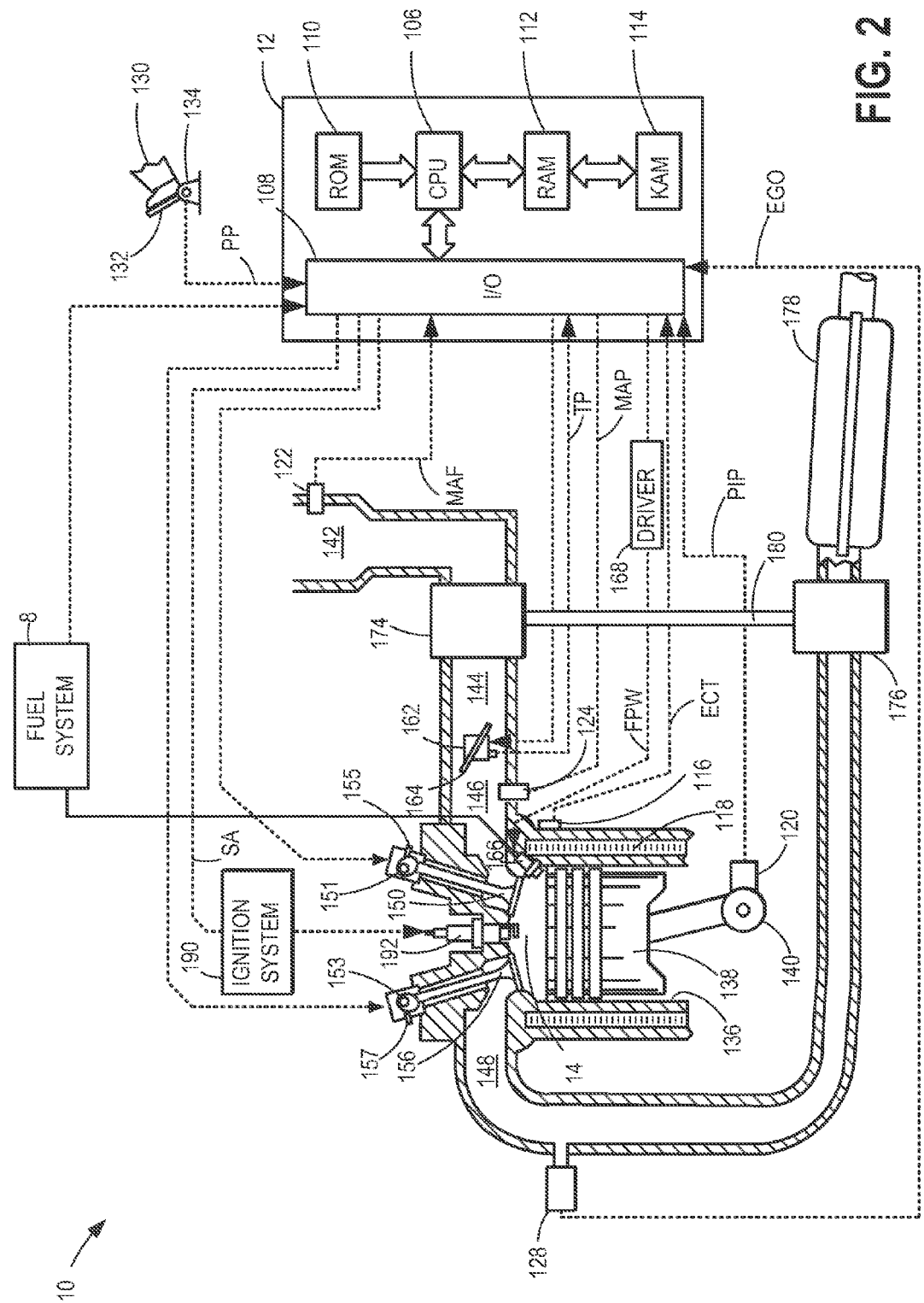
FIG. 2 shows a partial engine view.

The following description relates to systems and methods for engine systems configured to be automatically deactivated in response to selected idle-stop conditions, such as the engine system of FIGS. 1-2. Specifically, engine stopping and start may be improved by reducing shutdown shake experienced during an engine shutdown, and reducing engine speed flare during a subsequent engine restart. An engine controller may be configured to perform control routines, such as those depicted in FIGS. 3-4, during an engine idle-stop and/or restart operation, to adjust a cylinder valve timing for improved compression heating and to provide an anticipated cylinder air charge, based on whether an engine shutdown is deliberately performed, in response to an operator request, or automatically performed, in response to idle-stop conditions. Specifically, a cam timing device may be operated to preposition the valve timing during an engine shutdown based the origin of the engine stop request. In this way, the likelihood of the subsequent restart occurring under hot engine conditions (such as, during a restart following an idle-stop shutdown) or under cold engine conditions (such as, during a restart following an operator requested shutdown) can be anticipated. The valve timings may be further adjusted during the controller-initiated engine stop based on transmission tie-up torque, transmission speed, and engine speed in consideration of a sudden engine restart (such as due to a sudden driver change of mind). Example valve timing adjustments during various shutdown and restart operations are illustrated in FIG. 5. By reducing shutdown shake and improving compression heating during a subsequent engine restart, the quality of engine restarts may be improved.

FIG. 1 depicts an example embodiment of a vehicle system 100. As illustrated, an internal combustion engine 10, further described herein in FIG. 2, is shown coupled to torque converter 22 via crankshaft 21. Torque converter 22 is also coupled to transmission 24 via turbine shaft 23. Torque converter 22 has a bypass, or lock-up clutch (not shown) which may be engaged, disengaged, or partially engaged. When the clutch is either disengaged or partially engaged, the torque converter is said to be in an unlocked state. The lock-up clutch may be actuated electrically, hydraulically, or electro-hydraulically, for example. The lock-up clutch may receive a control signal from the controller (as shown in FIG. 2), such as a pulse width modulated signal, to engage, disengage, or partially engage, the clutch based on engine, vehicle, and/or transmission operating conditions.

Turbine shaft 23 is also known as a transmission input shaft. Transmission 24 comprises an electronically controlled transmission with a plurality of selectable discrete gear ratios. Transmission 24 also comprises various other gears, such as, for example, a final drive ratio 26. In alternate embodiments, a manual transmission operated by a driver with a clutch may be used. Further, various types of automatic transmission may be used. Transmission 24 is coupled to tire 28 via axle 27. Tire 28 interfaces the vehicle system to the road 30. In one embodiment, the powertrain of vehicle system 100 is coupled in a passenger vehicle that travels on the road.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Note that in some configurations cylinder air charge may be increased via advancing intake valve closing timing with respect to base intake valve closing timing. In other examples, cylinder air charge may be increased via retarding intake valve closing timing with respect to base intake valve closing timing. Therefore, the present description is not limited to a particular configuration where intake valve timing advances or retards to increase cylinder air charge.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Figure 3:
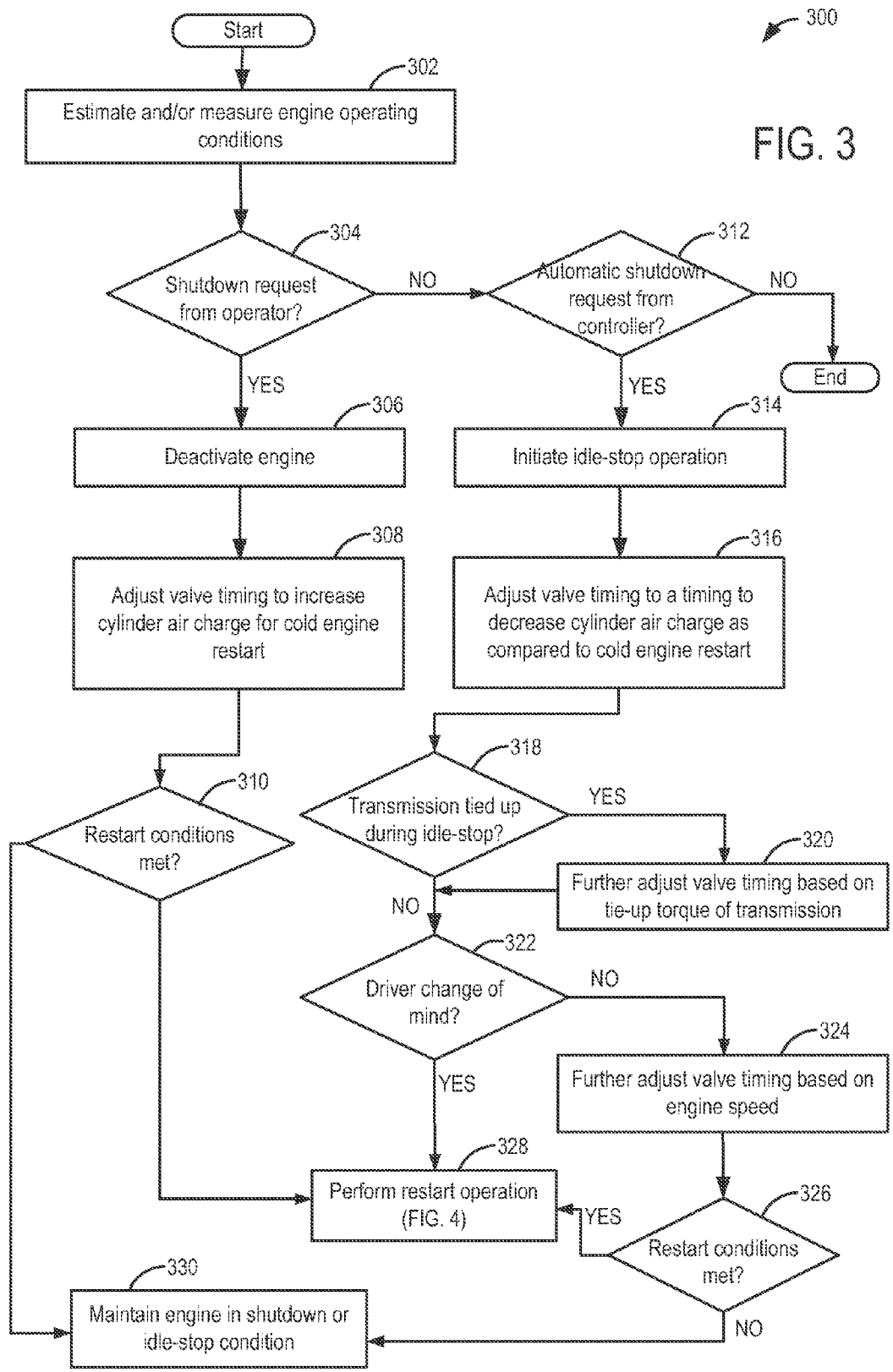
FIG. 3 shows a high level flow chart for shutting down an engine, according to the present disclosure.

Now turning to FIG. 3, an example routine 300 is described for performing an engine shutdown operation. The engine may be shutdown or deactivated in response to a shutdown request received from a vehicle operator, or in response to an automatic controller requested engine stop (e.g., due to selected engine idle-stop conditions being met without a request from the operator). The routine enables a cylinder valve timing to be adjusted based on the nature of the engine shutdown request to reduce shutdown shake while improving compression heating at the subsequent restart.

At 302, engine operating conditions may be estimated and/or measured. These may include, for example, ambient temperature and pressure, engine temperature, engine speed, transmission (input and output) speed, battery state of charge, fuels available, fuel alcohol content, etc. At 304, it may be determined if a shutdown request has been received from the vehicle operator. In one example, a shutdown request from the vehicle operator may be confirmed in response to a vehicle ignition being moved to a key-off position. If an operator requested shutdown is confirmed, then at 306, the engine may be deactivated by shutting off fuel and/or spark to the engine.

If an operator requested shutdown is not confirmed at 304, then at 312, it may be confirmed if an automatic shutdown request has been received from the controller. As such, the automatic controller requested engine stop may include an engine shutdown request in response to idle-stop conditions being met and without receiving an operator request to stop the engine. Thus, at 312, it may also be confirmed if idle-stop conditions have been met. Any or all of the idle-stop conditions, as further described herein, may be met for an idle-stop condition to be confirmed. Idle-stop conditions may include, for example, the engine status is operating (e.g., carrying out combustion), a battery state of charge (SOC) being more than a threshold (e.g., 30% SOC), vehicle running speed being within a desired range (e.g., no more than 30 mph), no request for air-conditioner operation, engine temperature (e.g., as inferred from an engine coolant temperature) being within a selected temperature range (e.g., above a threshold), a throttle opening degree (e.g., as determined by a throttle opening degree sensor) indicative of no start requested by the vehicle driver, a driver requested torque being less than a predetermined threshold, a brake sensor status indicating that the brake pedal has been pressed, an engine speed being below a threshold, an input shaft rotation number being below a predetermined threshold, etc. If idle-stop conditions are not met, the routine may end. However, if any or all of the idle-stop conditions are met, then at 314, the controller may initiate execution of the idle-stop operation and proceed to deactivate the engine when low or no engine torque is required. This may include shutting off fuel and/or spark to the engine.

Based on whether the engine shutdown was in response to the operator requested engine stop or the automatic controller initiated engine stop, an engine controller may adjust an engine cylinder valve timing, during the shutdown, to compensate for differences between engine operating conditions during the respective shutdowns, and in anticipation of initial differences between the respective subsequent engine restarts. In one example, the cylinder valve timings may be adjusted via a variable valve timing mechanism that prepositions the valve timing during the engine shutdown and before the subsequent restart. In another example, the cylinder valve timings may be adjusted via an electrically-actuated variable cam timing device that allows the valve timings to be further adjusted at the time of restart based on changes in operating conditions since the time the engine shutdown request was received.

At 308, in response to the operator requested engine stop (received at 304), an intake valve closing timing may be adjusted to a first timing, wherein the first timing is a timing where a larger amount of air is drawn into a cylinder of the engine during a subsequent restart of the engine. For example, intake valve closing timing can be adjusted to provide an amount of air that is sufficient to achieve a desired engine idle speed during cold engine operating conditions (e.g., an engine speed elevated from base engine idle speed) where engine friction is higher as compared to warm engine operating conditions. In comparison, at 316, in response to the automatic controller requested engine stop (received at 306), the intake valve closing timing may be adjusted to a second, different timing. For example, during an automatic controller initiated engine stop request, intake valve timing can be adjusted to provide an engine air amount that is desired to achieve a desired idle engine idle speed during warm engine operating conditions (e.g., a base engine idle speed). Thus, during a controller initiated engine stop, intake valve timing can be adjusted to provide a reduced engine air charge as compared to the engine air charge provided during an operator initiated engine stop request. As such, the first timing may be advanced or retarded from the second timing based on prevalent engine operating conditions. In one example, the first and second timings may be adjusted after the engine stops rotating and has come to a complete stop (e.g., via operation of the electrically-actuated variable cam timing device). Alternatively, the first and second timings may be adjusted during rotation of the engine before the engine stops spinning.

As such, the first timing may be based on operating conditions at a time of the operator requested engine stop. For example, the first and second timings may be adjusted based on an alcohol concentration of a fuel injected into the engine as well as in response to ambient temperature and pressure conditions. Thus, while the depicted routine indicates that the cylinder air charge when the valve timing is at the first timing is greater than the cylinder air charge at the second timing, in alternate embodiments, based on differing operating conditions at the time of the operator's stop request, the first and second valve timings may be adjusted such that the cylinder air charge when the valve timing is at the first timing is smaller than the cylinder air charge at the second timing.

Returning to 308, after adjusting the valve timing to the first timing in response to the operator requested engine shutdown, at 310, it may be determined if engine restart conditions (elaborated in FIG. 4) have been met. If restart conditions are not confirmed, at 330, the routine includes maintaining the engine in the shutdown condition. If restart conditions are confirmed, a restart operation, as described in FIG. 4, may be initiated.

Returning to 316, after adjusting the valve timing to the second timing in response to the automatic controller initiated engine shutdown, at 318 it may be determined if the transmission is being tied-up during the idle-stop. In one example, during an engine idle-stop, while the engine is spinning to rest, one or more transmission clutches may be engaged (e.g., partially or fully engaged) to apply a transmission tie-up torque. By maintaining some transmission torque during the engine idle-stop, at a subsequent engine restart request (such as due to a sudden driver change of mind), the engine may be rapidly brought down to a threshold speed from where the engine may be restarted. That is, the engine may be restarted without requiring the engine to be brought to complete rest. This allows the engine restart time from the idle-stop condition to be reduced. Thus, if transmission tie-up is confirmed at 318, at 320, the routine includes further adjusting the second timing based on the tie-up torque of the transmission. This includes adjusting the intake valve closing timing to increase the cylinder air charge when the tie-up torque is applied or increased, and adjusting the intake valve closing timing to decrease the cylinder air charge when the tie-up torque is released or decreased.

In one example, where the valve timing is adjusted by a variable cam timing device (e.g., VCT mechanism), the variable cam timing device is operated to first adjust the intake valve closing timing in response to the automatic controller requested engine stop, and then operated to further adjust the intake valve timing responsive to a transmission speed during the engine stop. Here, the transmission speed may be a transmission input shaft speed. Further, the transmission may be downshifted as the vehicle speed decreases. Thus, in one example, the valve timing may be adjusted so that a cylinder air charge is increased for higher transmission speeds and decreased for lower transmission speeds. In this way, by coordinating valve timing with transmission speed during an automatic controller initiated engine stop, valve timing can be better prepositioned to provide the anticipated air charge for a subsequent engine restart. Further, by adjusting the intake valve closing timing during an engine restart the engine air charge can be adjusted to accelerate the engine from stop to the synchronous speed (e.g., the speed where the engine speed matches the transmission speed). The transmission input shaft speed may be related to the vehicle speed as the vehicle decelerates toward a vehicle stop condition through the gears of the transmission. Thus, while the engine is stopped and while the vehicle is decelerating, the transmission input shaft speed may increase and decrease as the transmission downshifts and as the vehicle speed approaches zero. Accordingly, for systems that can adjust valve timing while the engine is stopped (e.g., systems having electrically adjustable cams or electrically actuated valves) intake valve timing may be adjusted when the engine is stopped via adjusting the position of an electrical actuator so that when the engine is restarted the engine air amount is adjusted so that the engine accelerated to the synchronous speed. For example, if the synchronous speed is high (e.g., 3000 RPM) the engine may be restarted with a first cylinder air charge. However, if the synchronous speed is low (e.g., 1000 RPM) the engine may be restarted with a second cylinder air charge, the second cylinder air charge less than the first cylinder air charge. In some examples, the intake valve opening timing can be adjusted during engine cranking so that the engine accelerates to the transmission speed.

At 322, the routine confirms if a driver change of mind has occurred and a sudden engine restart request has been received from the vehicle operator. If so, then the routine proceeds to 328 to perform a restart operation. If a driver change of mind is not confirmed, then at 324, the routine includes further adjusting the valve timing based on the engine speed at the time the restart request was received. For example, the valve timing may be adjusted from the second timing to a third timing in response to the engine speed being less than a threshold engine speed. The threshold engine speed may be an engine speed above which a change of mind operation may be supported (for example, supported by an engine starter) but below which the change of mind operation may not be supported. In this way, by adjusting the valve timing following an automatic controller requested engine stop differently based on engine speed, a different valve timing may be applied during the automatic controller initiated engine stop when the engine speed is greater than a threshold engine speed to provide an air charge that facilitates a change of mind scenario, while an alternate valve timing may be applied during the automatic controller initiated engine stop when the engine speed is less than the threshold engine speed to provide an air charge that facilitates an (anticipated) subsequent engine hot restart. For example, the cylinder air charge may be decreased for a hot start (e.g., 70° C.) as compared to a cylinder air charge for a cold engine start.

Figure 4:
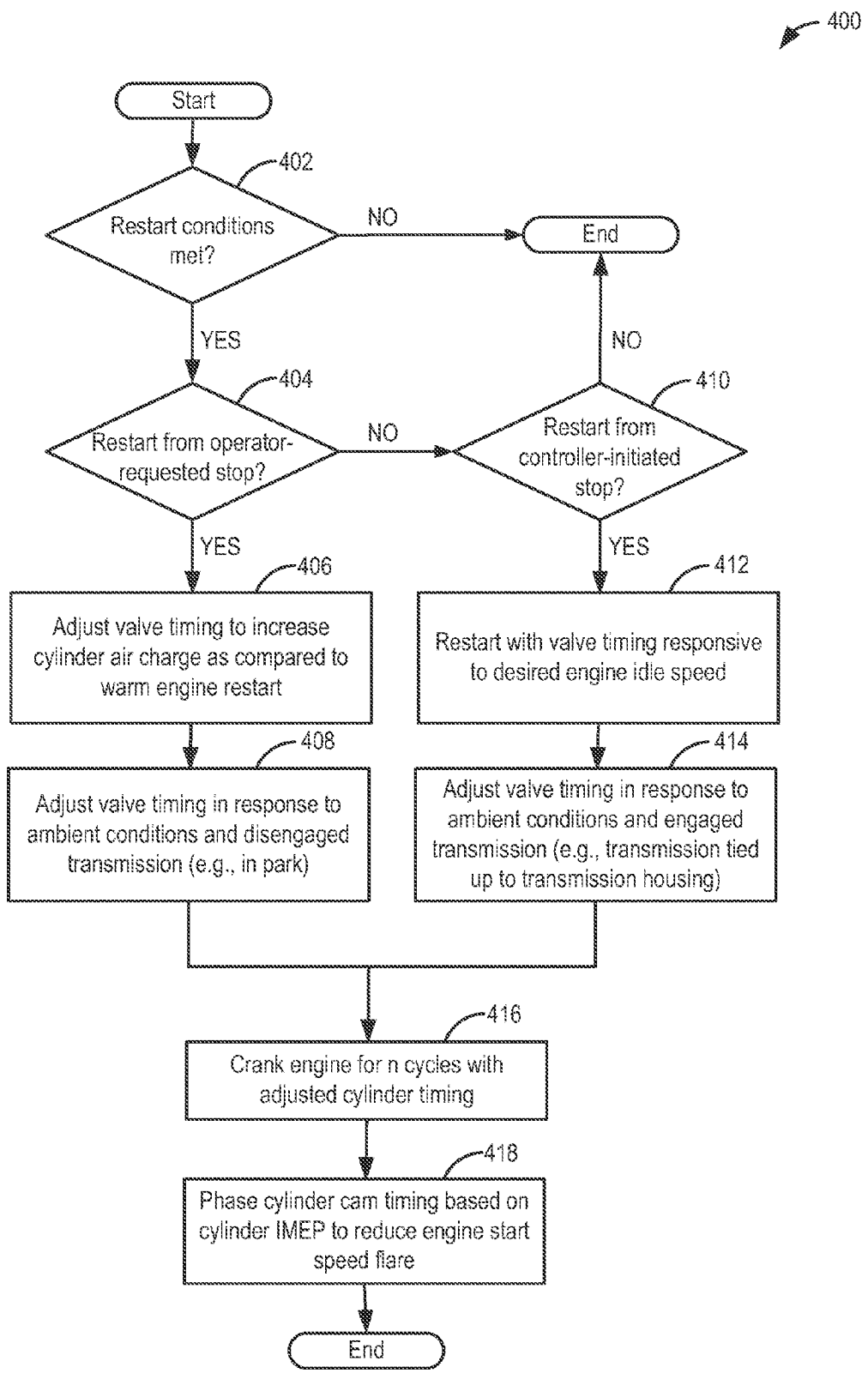
FIG. 4 shows a high level flow chart for restarting an engine, according to the present disclosure.
Figure 5:
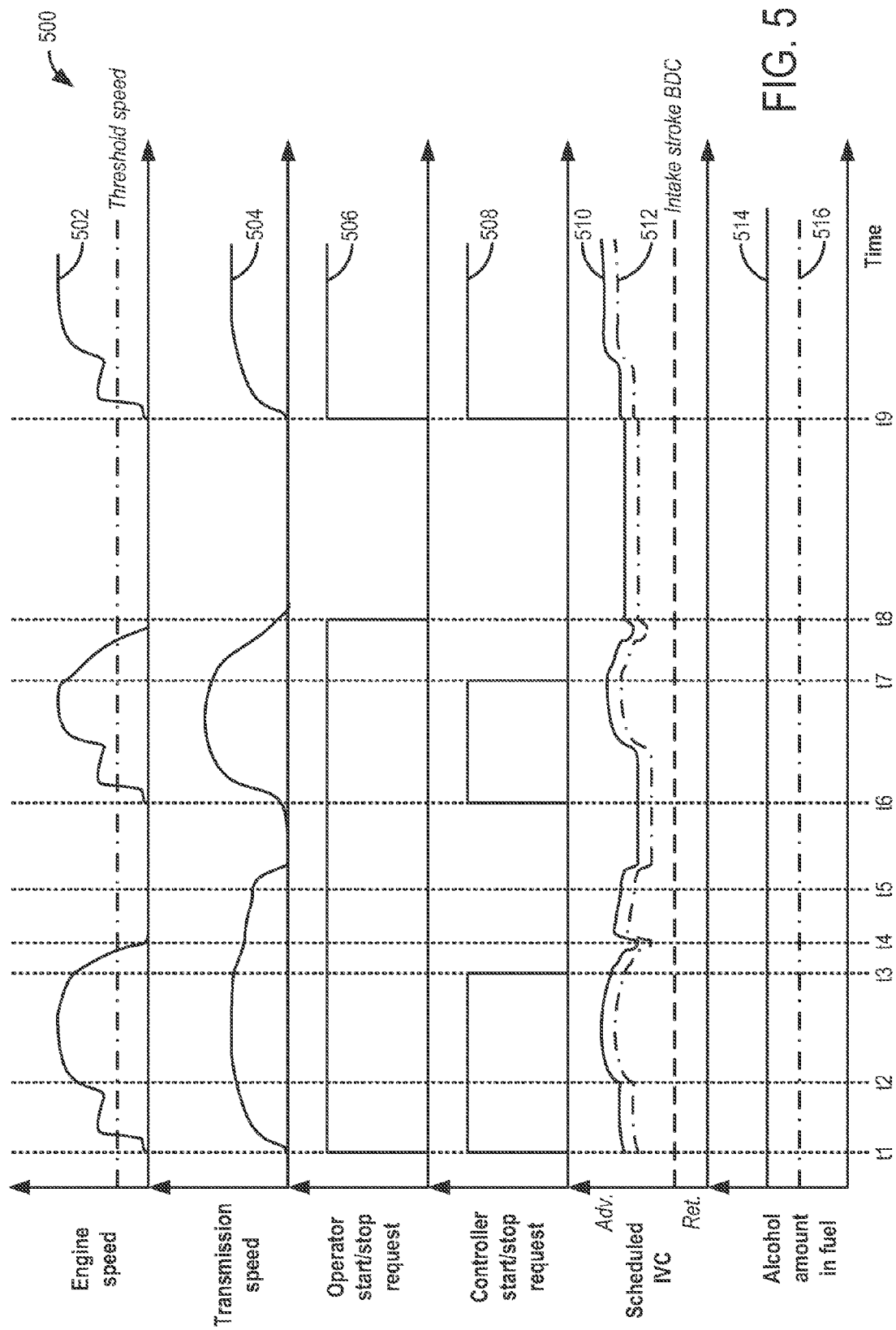
FIG. 5 shows prophetic example shutdown and restart scenarios.

Now turning to FIG. 4, an example routine 400 is described for restarting an engine from an engine shutdown condition. As such, the preceding engine shutdown may have been in response to a vehicle operator request or an engine shutdown automatically initiated by the controller in response to idle-stop conditions being met. Based on differences between the two shutdowns, a valve timing may be adjusted before restart to adjust cylinder air charge available upon engine cranking. In systems where the valve timing is adjusted by an electrically actuated cam timing device, the valve timing may be further adjusted at the time of engine restart in response to changes in operating conditions since the time the engine shutdown request was received. In this way, the quality of engine restarts can be improved.

At 402, engine restart conditions may be confirmed. As such, the engine may remain in the engine shutdown or idle-stop state (FIG. 3 at 330) until restart conditions are satisfied at 402. Any or all of the restart conditions, as further described herein, may be met for a restart condition to be confirmed. Restart conditions may include, driver requested torque being above a threshold, air conditioning being requested, battery SOC being below a threshold (for example, below 30%), emission control device temperature being below a threshold, vehicle speed being above a threshold, a pedal position sensor indicating accelerator pedal being engaged, and/or a brake pedal being released, an electrical load of the engine being above a threshold, etc.

If any or all of the restart conditions are met, then at 404, it may be confirmed whether the restart is from a preceding operator-requested stop. If yes, then at 406, cylinder intake valve timing may be adjusted to increase cylinder air charge as compared to a controller initiated engine stop. For example, the routine may include advancing intake valve closing timing to increase cylinder air charge. In one example, the valve timing adjustments may be performed during the engine restart only where engine conditions have changed since the operator requested engine stop. In another example, the valve timing adjusted may be performed at all engine restarts from the operator requested engine stop. If the operator initiates an engine stop request during a controller initiated stop after the engine is stopped, the engine stop may be treated as an operator initiated engine stop request. Thus, the intake valve closing timing can be adjusted to provide a cylinder air charge suitable for cold engine restart conditions.

If the restart is not from an operator-requested stop, then at 408, it may be confirmed that the restart is from a controller initiated engine stop. If yes, then at 410, the routine may include cranking the engine to restart the engine with the intake valve closing timing at a timing responsive to a desired engine idle speed during warm engine operating conditions. Thus, the intake valve closing timing may be adjusted to decrease the cylinder air charge as compared to the amount of cylinder air charge that is provided during a cold engine restart. In one example, the valve timing responsive to the desired engine idle speed may have been set during the preceding idle-stop operation. If so, the engine may be reactivated with the timing previously set during the preceding engine shutdown. In other examples, the intake valve closing timing may be adjusted responsive to a transmission speed so that the engine accelerates up to the transmission speed (e.g., when the engine is restarted while the vehicle is moving). At 406 and 410, an exhaust valve timing may be further adjusted at the engine restart to limit air flow through the engine's exhaust system. By limiting air flow through an engine exhaust system at engine restart, oxygen migration may be reduced and the amount of fuel required to bring the catalyst to the desired light-off temperature may be decreased. For example, intake valve closing timing may be adjusted to provide a small cylinder air charge until the engine reaches cranking speed and then the cylinder air charge may be increased.

At 412, the engine may be reactivated by cranking the engine for a given number of cycles with the adjusted cylinder timing. At 416, the desired intake valve closing timing may be phased in (e.g., by adjusting phase between a camshaft phasor rotor and a camshaft) based on cylinder IMEP to reduce engine start speed flare. In this way, valve timing may be adjusted during an engine shutdown and an engine restart to improve compression heating and engine startability.

Now turning to FIG. 5, prophetic sequence 500 is shown depicting example engine shutdown and restart scenarios for an engine system according to the present disclosure. The engine system may include a valve timing mechanism, such as a variable cam timing device, for adjusting the valve timing. The X axis of each plot shown in FIG. 5 represents time, and time increases from the left to right side of the plots. In addition, vertical markers t1-t9 are used to identify events of interest during the illustrated sequence.

Sequence 500 depicts engine speed at 502, transmission input speed at 504, an indication of the vehicle operator's start/stop request at 506, an indication of the controller's automatic start/stop operation at 508, a scheduled intake valve closing timing (IVC) at 510 and 512 for respective fuel alcohol concentrations at 514 and 516.

At time t1, an engine start request is received from the vehicle operator (see 506), for example, in response to a key-on operation by the operator. In a first example, the engine is started by injecting a first fuel with a higher alcohol content (see solid line 514) and valve timing adjustments for the engine are shown at graph 510 (solid line). In the first example, the engine is started with an advanced intake valve closing timing (see 510) for increasing the effective compression ratio of the cylinder and improving charge heating. The advanced intake valve closing timing was prepositioned during the preceding engine stop in response to an operator requested engine stop. In one example, it may be anticipated that a cold start will follow an operator initiated engine stop while a warm engine start will follow a controller initiated engine stop. The intake valve closing timing shown corresponds to a higher cylinder air charge to facilitate engine spin-up during cold conditions. In addition, the cylinder air charge is increased by advancing intake valve closing timing as compared valve timing during warm engine starts so that higher engine friction during cold engine starting may be overcome. Thus, whether or not there is alcohol present in the fuel combusted by the engine, cylinder air charge is increased in response to an operator initiated engine stop as compared to a controller initiated engine stop.

In response to the engine start request, the engine speed (see 502) is shown increasing. A transmission input speed (see 504) may also increase correspondingly. At t2, once an engine idle speed has been reached, the intake valve closing timing may be adjusted according to engine speed and a torque request from the operator. In the depicted example, the intake closing timing is further advanced from the timing at start as the operator torque demand increases. The intake valve closing timing is also shown being retarded as the operator torque request decreases. Further, intake valve closing timings may be adjusted for other operating conditions such as alcohol content in the fuel combusted by the engine. As such, the valve timings are adjusted based on various engine operating conditions including the alcohol content of the fuel injected (herein 514), as well as ambient temperature and pressure conditions. Thus, in an alternate example, based on the engine operating conditions, the first intake valve closing timing may be more retarded than the second intake valve closing timing.

At t3, in response to engine idle-stop conditions being met (e.g., in response to an operator pedal tip-out), an automatic controller initiated engine stop request may be received (see 508) without receiving an engine stop request from the vehicle operator (see 506). In response to the controller's engine stop request, the intake valve closing timing may be adjusted to a timing (herein a more retarded timing) wherein cylinder air charge is reduced. The valve timing may be adjusted to a first timing while the engine is spinning down and the engine speed is greater than a threshold speed (dashed and dotted line), and then to a second, more retarded, timing while the engine is spinning down and the engine speed is lower than the threshold speed. Herein, the threshold speed corresponds to a speed above which a sudden driver change of mind engine restart request can be accommodated without spinning the engine down to a complete rest. Thus, in anticipation of a driver change of mind and the ensuing need to restart the engine at higher engine speeds, the first valve timing may correspond to a higher cylinder air charge. In comparison, a driver change of mind restart request received once the engine speed is below the threshold cannot be accommodated without first bringing the engine to rest. Thus, the second valve timing (herein more retarded) may correspond to a timing wherein there is a lower cylinder air charge in anticipation of a subsequent engine hot restart. By reducing the cylinder air charge during engine shutdown it may be possible to reduce the amount of oxygen that is pumped into the engine exhaust system so that extra fuel does not have to be injected during warm engine restarts to control NOx. Thus between t3 and t4, the valve timing (see 510) may have two adjustments, a first adjustment to the first timing when the engine speed is higher than the threshold speed, and a second adjustment to the second timing when the engine speed is below the threshold speed. At t4, the engine may come to a complete rest (see 502) while the transmission continues to spin (see 504) and the as the vehicle coasts to a stop. While the engine is in idle-stop, and with the vehicle coasting, at t5, the transmission may be downshifted as the vehicle speed decreases.

Between time t4 and t5, intake valve closing timing may be adjusted in response to a speed of the transmission (e.g., transmission input shaft speed) so that the engine may be restarted and accelerate to a speed synchronous with the transmission speed. In one example, the intake valve closing timing is advanced to increase cylinder air charge as a transmission speed is increased. Further, the intake valve closing timing is retarded to decrease cylinder air charge as transmission speed decreases. Thus, cylinder air charge is adjusted so that the engine speed quickly approaches the transmission speed during engine restart. In this way, torque disturbances through the vehicle drivetrain may be reduced.

Between t5 and t6, during the engine idle-stop condition, the transmission may be tied-up with a transmission tie-up torque. Thus, during the controller initiated engine shutdown, the valve timing may be further adjusted based on the transmission tie-up torque and transmission speed. Specifically, as a tie-up torque is applied and/or increased after the engine has come to a stop after t5, the valve timing is adjusted to a timing (herein more advanced) wherein the cylinder air charge is increased. Further, the higher the tie-up torque applied to in the transmission the higher cylinder air charge is commanded via advancing or retarding cam timing. Thus, at the higher transmission speeds (between t4 and t5), the intake valve timing is adjusted to a timing so that a cylinder air charge is increased, while at the lower transmission speeds (between t5 and t6), the intake valve timing is adjusted to a timing so that a cylinder air charge is decreased. Intake valve closing timing adjustments cease when the transmission and engine are stopped, at least until an engine restart is requested.

At t6, in response to restart conditions being met (e.g., in response to a request for air conditioning), the engine may be restarted. At this time, the valve timing may be adjusted (e.g., advanced) to a timing where a cylinder air charge is increased to account for the engine restart. In one example, intake valve closing timing can be adjusted for ambient conditions at the time of the engine restart command. For example, if intake valve closing timing has been adjusted to provide a cylinder air amount for cold starting in response to an operator initiate stop, intake valve closing timing can be adjusted to provide less air for warm engine starting when an operator initiated stop is not followed by a cold engine start. Intake valve closing timing is adjusted in response to the engine torque request and engine speed after the engine is restarted.

At t7, as at t3, in response to idle-stop conditions being met, an automatic controller initiated engine shutdown request may be received. As at t3, the valve timing may be adjusted with the engine speed as the engine spins to rest, with the adjustment varying when the engine speed is above the threshold speed (to enable a driver change of mind engine restart) and different when the engine speed is below the threshold speed (to enable an engine hot restart).

At t8, an operator shutdown request is received (for example, in response to an operator keying-off). In response to the operator shutdown request, the valve closing timing is adjusted to increase the cylinder air charge as compared to a controller initiated engine stop. In the depicted example, the intake valve closing timing provided in response to the operator-requested engine shutdown (at t8) is more advanced than the intake valve closing timing adjustment that is provided in response to the controller initiated shutdown request (at t3 or t7). However, in alternate examples, based on operating conditions, the intake valve closing timing at t8 may be more retarded to provide the increased cylinder air charge.

The valve timings determined at t8 may be maintained until a subsequent engine restart request is received at t9. In this way, by prepositioning cam timing devices based on the nature of the engine shutdown request, cylinder air charge may be more accurately provided at a subsequent engine restart, thereby improving cylinder compression heating and engine startability. Further, if the cam timing device is electrically actuated, at engine restart at t9, valve timing may be further adjusted (not shown) based on changes in operating conditions (e.g., changes in ambient temperature and pressure, etc.) since the time the engine shutdown request was received (at t8).

As such, the valve timings shown by dash-dot are also adjusted based on the type of fuel injected into the engine, for example, based on the alcohol content of the injected fuel. Line 512 shows a second example of valve timing adjustments in response to the same engine restart and shutdown requests for a scenario where the injected fuel has a lower alcohol concentration. In the depicted example, at any given time, the valve timings may be less advanced as the alcohol content of the injected fuel decreases.

In this way, engine intake valve closing timing may be adjusted in response to an operator or controller engine stop request in anticipation of an engine restart. Further, intake valve closing timing adjustments may include adjustments for ambient conditions (e.g., temperature and pressure), alcohol concentration of fuel injected to the engine, and synchronous transmission speed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine, comprising:
   operating the engine with an intake valve closing timing;
   adjusting the intake valve closing timing from the intake valve closing timing to a first timing in response to an operator requested engine stop; and
   adjusting the intake valve closing timing from the intake valve closing timing to a second timing based on a transmission torque downstream of a torque converter and in response to an automatic controller requested engine stop.

2. The method of claim 1, wherein the first timing is a timing where a larger amount of air is drawn into a cylinder of the engine during a restart of the engine as compared to the second timing.

3. The method of claim 1, wherein the transmission torque is provided by engaging a gear clutch in response to the automatic controller requested engine stop.

4. The method of claim 3, further comprising adjusting the intake valve closing timing to decrease cylinder air charge when the transmission torque is released or decreased.

5. The method of claim 1, where the first and second timings are adjusted via an electrically-actuated variable cam timing device, and where the first and second timings are adjusted after the engine stops rotating.

6. The method of claim 1, wherein the first and second timings are adjusted during rotation of the engine before an engine stop, and wherein the second timing is further adjusted responsive to a tie-up torque of a transmission in response to the automatic controller requested engine stop.

7. The method of claim 6, wherein the second timing is further adjusted to a third timing in response to an engine speed less than a threshold engine speed.

8. The method of claim 1, where the first timing is advanced or retarded from the second timing, and where the second timing is further adjusted in response to ambient temperature and pressure.

9. The method of claim 8, wherein the second timing is further adjusted based on an alcohol concentration of a fuel injected to the engine.

10. A method of controlling an engine, comprising:
    adjusting a variable cam timing device to adjust intake valve timing in response to an automatic controller requested engine stop; and
    adjusting the variable cam timing device to further adjust the intake valve timing responsive to a transmission input shaft speed downstream of a torque converter during engine stop.

11. The method of claim 10, wherein the automatic controller requested engine stop includes an engine shutdown in response to idle-stop conditions and without receiving an operator request to stop the engine, and further comprising adjusting the intake valve timing responsive to a transmission tie-up torque.

12. The method of claim 10, wherein a transmission is downshifted as a vehicle speed decreases in response to the automatic controller requested engine stop, and where the variable cam timing device is further adjusted responsive to the transmission input shaft speed downstream of the torque converter during an engine restart.

13. The method of claim 10, wherein the variable cam timing device is adjusted to adjust the intake valve timing so that a cylinder air charge is increased for higher transmission input shaft speeds and decreased for lower transmission input shaft speeds, and further comprising engaging a transmission clutch in response to the automatic controller requested engine stop to provide a transmission tie-up torque, and adjusting the intake valve timing responsive to the tie-up torque.

14. The method of claim 10, further comprising,
during a restart from the automatic controller requested engine stop, cranking the engine to restart the engine with the intake valve timing at a timing responsive to a desired engine idle speed.

15. The method of claim 14, further comprising adjusting exhaust valve timing to limit air flow through an engine exhaust system, and adjusting intake valve timing when the engine is stopped while a vehicle in which the engine operates is decelerating in response to the transmission input shaft speed.

16. A method of controlling an engine, comprising:
adjusting the intake valve closing timing during an engine stop based on a transmission torque downstream of a torque converter.

17. The method of claim 16, where the transmission torque is produced via engaging a transmission gear clutch in response to an automatic controller requested engine stop, and where the transmission torque is a tie-up torque.

* * * * *